United States Patent [19]

Claussen et al.

[11] Patent Number: 4,544,583
[45] Date of Patent: Oct. 1, 1985

[54] BIREFRINGENCE-FREE PLASTICS

[75] Inventors: Uwe Claussen; Hellmut Hannes, both of Leverkusen; Hans-Leo Weber, Rommerskirchen, all of Fed. Rep. of Germany

[73] Assignee: Bayer Aktiengesellschaft, Leverkusen, Fed. Rep. of Germany

[21] Appl. No.: 536,411

[22] Filed: Sep. 27, 1983

[30] Foreign Application Priority Data

Oct. 9, 1982 [DE] Fed. Rep. of Germany ....... 3237480
Aug. 3, 1983 [DE] Fed. Rep. of Germany ....... 3327929

[51] Int. Cl.$^4$ ................................................. C09K 3/34
[52] U.S. Cl. ......................................... 428/1; 350/334; 350/337; 350/341; 350/344; 428/212; 428/213; 428/412; 428/913
[58] Field of Search ................... 428/1, 212, 213, 412, 428/423.1, 500, 522, 532, 913; 427/163; 350/330, 331 R, 334, 337, 341, 344

[56] References Cited

U.S. PATENT DOCUMENTS 2,441,049 6/1948 West .................................... 428/212

FOREIGN PATENT DOCUMENTS 0089493 9/1983 European Pat. Off. .

OTHER PUBLICATIONS

Adams and Wexler, "Superimposed Birefractory Plates", 11/30/64, pp. 103–114.
Torbin and Daminov, "Polymer Optical Components", 10/74, pp. 492–498.

Primary Examiner—Geroge F. Lesmes
Assistant Examiner—P. R. Schwartz
Attorney, Agent, or Firm—Sprung Horn Kramer & Woods

[57] ABSTRACT

Birefringence-free arrangement of plastic foils, characterized in that two plastic foils having a single principal optical axis, said optical axis lying within the plane of the plastic foil, are arranged parallel behind each other so that the optical axes of both plastic foils are forming an angle of 90°±7° and the material of the foils with regard to its optical properties and the thickness of the foils being selected in such a manner that the optical path differences $\Delta n_1 D_1$ for the light waves which are associated with the two main refraction indices within the first plastic foil is approximately equal to the optical path difference $\Delta n_2 d_2$ of the second plastic foil, $\Delta n_1$, $\Delta n_2$, being the difference of the main refraction indices in the first and second foil, respectively, and $d_1$, $d_2$ standing for their thicknesses, and the use of said arrangement in components and devices in which polarized light is used, especially in liquid crystal displays.

12 Claims, No Drawings

BIREFRINGENCE-FREE PLASTICS

The invention relates to a birefringence-free arrangement of plastic foils and its use in components and devices in which polarised light is used, such as visual displays, in particular liquid crystal displays.

In visual displays—especially in liquid crystal displays—glass has hitherto been used as the universal material and the only material which has been utilised industrially.

However, the use of glass has a number of disadvantages. For reasons of cost, alkali metal silicate glasses are used, and these must be coated with SiO in order to prevent migration of the alkali metal. The shapes are limited, because glass is brittle. Only certain shapes, which depend on the mechanical equipment, can therefore be processed, and these can be inexpensively subdivided by scoring and breaking only into rectangular shapes. A further principal disadvantage is the chipping of glass plates. This is the cause of downtime, because it prevents the distance between the plates, which is only about $10\mu$, being maintained.

The expenditure on handling and storage of the high piece numbers and various shapes obtained is also substantial. Moreover, the fragility of the glass means plate thicknesses of at least 1 mm, which are heavy in weight because of the specific density, which in turn is unfavourable for transportation and also for later use.

There has therefore been no lack of attempts to use transparent plastics, for example for liquid crystal displays (see, for example, U.S. Pat. No. 4,228,574, British Patent Specification No. 2,052,779, JP No. 56 126 720, JP No. 50 17 135, JP No. 56 053 169, JP No. 60 72 484 and JP No. 61 55 922). The construction of liquid crystal displays based on plastics is also known from SID 81, page 86 et seq.; SID 81, page 116 et seq. and SID 82, pages 178-181. However, as a rule, plastics are neither particularly isotropically nor particularly mechanically or chemically stable, nor cheap; on the other hand, they are outstandingly suitable for automated production (U.S. Pat. No. 4,228,574). It is evident that the technology of glass displays cannot be simply transferred to plastics. Although a plastic can be found which closely matches, or is even superior to, the properties of the glass for each process step of glass technology, no cell made of plastic has yet been described which would be equally as good as the glass cell, simply because all the properties must be provided by one plastic.

It has thus been proposed to use polyesters in place of glass. As a film, polyester is highly birefringent, and thus cannot be employed in the hitherto customary components using polarisers. Cellulose butyrate is isotropic, but unsatisfactory in respect of its mechanical, especially thermal, and chemical properties. In addition, the material is relatively light-scattering.

Polycarbonate has also been proposed (JP No. 55 017 135).

If the plastic is not naturally isotropic, such as cellulose butyrate, the literature contains no indication or proposal solutions of how the problem of optical birefringence can be overcome.

Since many industrial important types of display for example the twisted nematic cell or the Heilmeier cell used polarized light it is an essential requirement that optical elements such as windows which are used in connection with such cells have no disturbing influence on the polarized light. It is well known that birefringence in a crystal having a single principal axis originates from the fact that light beams with perpendicular planes of polarization are refracted in a different manner. For example the well-known Nichol prism for producing polarized light is based on this principle. Simultaneously with the birefringence the polarization state of the light is changed. In particular plane polarized light falling perpendicular on the plastic foil may be converted into elliptic polyarized light. It is therefore evident that the use of birefringent plastic foils as windows or substrates in connection with displays leads to substantial difficulties if the display effect itself is caused by a birefringence or rotation of the plane of polarization induced or effected by the applied electric field in the liquid crystal layer. The solution of the problem of birefringence therefore constitutes the essential requirement for the industrial application of plastic foils within liquid crystal displays.

The invention is therefore based on the object of discovering constructions of plastics in which the birefringence has no interfering influence. For use in displays, in addition to having adequate mechanical properties, such as dimensional stability, permeability to water vapour, scratch-resistance and insensitivity to temperature, it must be possible for them to be processed continuously and flexibly to all the required shapes, and they must be chemically resistant towards the action of diverse auxiliary chemicals, such as liquid crystals, dyestuffs, orientation layers and the like.

According to the invention this object is achieved by a system in which two plastic foils each having a single principal optical axis, said axis lying within the plane of the plastic foil, are arranged parallel behind each other so that the optical axis of both plastic foils are forming an angle of $90°\pm70°$ and the material of the foils with regard to its optical properties and the thickness of the foils being selected in such a manner that the optical path difference $\Delta n_1 d_1$ for the light waves which are associated with the two main refraction indices within the first plastic foil is approximately equal with the optical path difference $\Delta n_2 d_2$ of the second plastic foil. In this connection $\Delta n_1, \Delta N_2$ means the differences of the main refraction indices in the first respective second plastic foil and $d_1$, $d_2$ designate their thicknesses. Two light waves allocated to the main refraction indices which are polarized perpendicular with respect to each other therefore undergo an optical path difference in the first plastic foil which is then compensated by the second plastic foil. With other words: the phase shift between the two light waves produced by the first plastic foil is reversed by the second plastic foil. Plane polarized light therefore may pass this device without any troublesome effect of birefringence. The creation of elliptic polarized light is avoided.

In principle there could be arranged more than two foils behind each other for which the condition is met that the phase shifts in the individual foils combine in such a manner that the light beams on leaving the last foil have zero phase shift (zero optical path difference). This constitutes, however, only a more complicated utilization of the principle underlying the invention. The invention is particularly clear and apparent if both plastic foils consist of the same material and have the same thickness, i.e. if they are for example cut from the same large foil.

The plastic must have one principal axis and be birefringent. The birefringence characterising the material can be described definitively as the difference between the principal refractive indices ($\Delta n$), and then characterises the material property irrespective of the thickness of the object.

Birefringence is measured in the form of a path difference (optical path difference) as the product $G = \Delta n \cdot d$ ($d$ = film thickness). G has the dimension of length and is usually given in nanometers.

It turned out that the observance of the right angle between the principal axis, i.e. the orientation of the two foils with respect to each other, is of particular importance. The tolerance of the right angle should not exceed $\pm 7°$, preferably $\pm 2°$. On the other hand the tolerance for the thickness of the plastic foils is less tolerant. For instance with plastic foils of the same type differences of the thickness up to 10 $\mu$m may be tolerated.

The direction of the optical axis within the film must be sufficiently constant. Variations cause, in particular, inhomogeneity of the optical properties, which manifest themselves, inter alia, in cloudy brighening effects of the field of view between crossed polarisers. Efforts should therefore be made to obtain as small a deviation as possible, which must be below 7°.

The optical compensation depends only on the size of the optical path difference of the birefringence. As a result, several different films of different birefringence but appropriate thickness can be combined with one another.

The thickness of the films can vary between 800 and 5 $\mu$m. They preferably have a thickness of 50 to 250 $\mu$m.

There are numerous different designs for a display, of which the twisted nematic cell, the "guest-host" cell and the double layer cell may be mentioned as examples. They can be $\alpha$-numerical or matrix-controlled.

However, in respect of the effect, it is unimportant where the nematic phases are arranged. The nematic phases can be arranged in front of, between or behind the optically monoaxial crossed films, depending on the type of construction or the technical requirements. Only the question of whether overall compensation of the optical path length difference is achieved is decisive.

Preferably both plastic foils are combined to a laminate so that a plastic compound is formed. Such a compound can be prepared by welding the foils uniformly with each other.

In a particular embodiment, the films are stuck flatly to one another.

In principle, any material which gives optically transparent, colourless and birefringent layers can be used as the adhesive. Reactive adhesives, in particular two-component reactive adhesives, are preferred. Of these, polyurethane adhesives have proved particularly useful, bondings which are especially fast to light being obtained with linear aliphatic isocyanates. Solvent-containing and solvent-free adhesive formulations can equally well be used. Solvent-free systems are frequently easier to handle and are therefore preferred. The adhesive can contain auxiliaries and additives which influence its processing properties, for example the setting time.

Under certain circumstances, the adhesive layer can be included in the optical or mechanical functions. In the embodiment with two equal foils it is favourable with regard to the optical properties if the adhesive layer has the same refractive index as the foils. In this way disturbing reflections at the intermediate adhesive layer can be minimized. Further the adhesive layer can assume water vapour-blocking or gas-blocking functions.

In a further embodiment, two films which have the same refractive index and are of the same thickness are used.

All the required shapes can be produced as required from this uncomplicated, birefringence-free laminated film, so that this embodiment is particularly economical both from the point of view of build-up and from the point of view of storage.

Although the film in the form described is already sufficiently ready-to-use, it can be further improved by surface treatments. In particular, scratch-resistant coatings with, for example, polyacrylates and/or polymethacrylates, Si-containing polymers, such as silanes or siloxanes, or surface crosslinking by the effect of electrical discharge, such as plasma polymerisation, are especially suitable. In a possible embodiment, the films are provided with halogenated compounds, such as dichlorovinylidene chloride (DCVC), but in particular fluorinated compounds or polyethylene, coatings being particularly preferred.

The permeability to water vapour can be substantially reduced by these measures, which is particularly advantageous for displays.

Slight roughness, in particular microroughness, and a slight variation in thickness is necessary for use in displays and other elements where high accuracy is important. Microroughness is understood as meaning unevenness of the surface in the microscopic range (lateral structure approximately $<30$ $\mu$m). In this range, it must be $<0.2$ $\mu$m, preferably $<0.05$ $\mu$m, and no specks, troughs, bumps or the like should occur. The microroughness is tested by a reflected light interference microscope on samples which have first undergone vapour-deposition with metals.

Variation in thickness is understood as meaning the change in thickness of a film over relatively long distances (mm or cm range). The variation in thickness of a $7\times 7$ cm plate should be $<10$ $\mu$m, preferably $<5$ $\mu$m, and the gradient should be $<3$ $\mu$m/cm. The variation is tested in transmitted light using a Mach-Zehnder interferometer.

Suitable plastics are those which give clearly transparent, sheet-like structures and can be prepared with one optical axis. This can be effected, for example, by casting or extrusion, but no universal process can be given. In principle, it is necessary to make the polymer web mobile and to orientate it by applying a slight directional force; if this mobility is now frozen in under the influence of a directional force, an optically monoaxial plastic is formed.

Casting processes in which the polymer is dissolved in a suitable solvent having as low a volatility as possible and is subsequently cast to a layer, from which the solvent can be removed, for example by vaporisation, are preferred. Polycarbonate is particularly suitable for this process.

Examples of suitable plastics are polyaryl sulphone, polystyrene, polyvinyl chloride and polyurethane. Polymers which have good optical qualities, such as styrene/acrylonitrile copolymers, polymethylpentene, polycarbonate, polyacrylates, polymethacrylates, cellulose esters or mixtures and copolymers containing the polymers mentioned are preferably used. Polycarbonate or mixtures of plastics containing at least 10% by weight of polycarbonate are very particularly preferably used.

Cast films of mixtures of 90% by weight to 60% by weight of linear polyaryl sulphone and 10% by weight to 40% by weight of linear polycarbonate, such as are known, for example, from German Offenlegungsschrift No. 2,948,673, are particularly suitable for the preparation of the birefringence-free plastics according to the invention.

These preferably have weight-average molecular weights $\overline{M}_w > 60,000$, and can be obtained, for example, by stabilising solutions of the polyaryl sulphones and polycarbonates by addition of a solubilising agent in amounts of 5–30% by weight, based on the solids employed, before production of the cast films, and then drying the cast films produced by customary processes and stretching them in a stretching ratio of between 1:2 and 1:5 by customary processes above the freezing point of the polyaryl sulphone/polycarbonate mixtures.

Suitable polycarbonates in the context of the invention are the polycondensates obtainable by reacting aromatic dihydroxy compounds, in particular dihydroxydiarylalkanes, with phosgene or diesters of carbonic acid, although, in addition to the unsubstituted dihydroxydiarylalkanes, those in which the aryl radicals carry methyl groups or halogen atoms in the o- and/or m-position relative to the hydroxyl group are also suitable. Branched polycarbonates are likewise suitable. Cast polycarbonate is preferred.

The polycarbonates have weight-average molecular weights $\overline{M}w$ of between 10,000 and 100,000, preferably between 20,000 and 40,000, determined by measuring $\eta_{rel}$ in $CH_2Cl_2$ at 20° C. and at a concentration of 0.5 g per 100 ml. The $\overline{M}_w$ of the polycarbonate cast material is preferably 75,000–110,000.

Examples of suitable aromatic dihydroxy compounds are hydroquinone, resorcinol, 4,4'-dihydroxydiphenyl, bis-(hydroxyphenyl)alkanes, such as, for example, $C_1$–$C_8$-alkylidenebisphenols, bis-(hydroxyphenyl)-cycloalkanes, such as, for example, $C_5$–$C_{15}$-cycloalkylene- or $C_5$–$C_{15}$-cycloalkylidene-bisphenols, and bis-(hydroxyphenyl)sulphides, ethers, ketones, sulphoxides or sulphones, and furthermore $\alpha,\alpha'$-bis-(hydroxyphenyl)-diisopropyl-benzene and the corresponding nuclear-alkylated or nuclear-halogenated compounds. Polycarbonates bsed on 2,2-bis-(4-hydroxyphenyl)-propane (bisphenol A), 2,2-bis-(4-hydroxy-3,5-dichlorophenyl)-propane (tetrachlorobisphenol A), 2,2-bis-(4-hydroxy-5,5-dibromophenyl)-propane (tetrabromobisphenol A), 2,2-bis-(4-hydroxy-3,5-dimethylphenyl)-propane (tetramethylbisphenol A), 1,1-bis-(4-hydroxyphenyl)-cyclohexane (bisphenol Z) or trinuclear bisphenols, such as $\alpha,\alpha'$-bis-(4-hydroxyphenyl)-p-diisopropylbenzene are preferred.

Other aromatic dihydroxy compounds which are suitable for the preparation of polycarbonates are described in U.S. Pat. Nos. 2,970,131, 2,991,273, 2,999,835, 2,999,846, 3,028,365, 3,062,781 and 3,271,367.

Cellulose esters in the context of the invention are obtained by customary processes by esterification of cellulose with aliphatic monocarboxylic anhydrides, preferably acetic and butyric anhydrides or acetic and propionic anhydrides. The hydrolysis, to be carried out in the crude solution, is controlled by a slight excess of water so that a low hydroxyl content (4 to 25) is obtained. The oxidative bleaching of the cellulose ester isolated from the solution must be carried out such that the oxidising agent can no longer be detected in the end product; if necessary, the end product must be after-treated with a reducing agent.

To determine the OH number, the free hydroxyl groups of the cellulose ester are esterified with acetic anhydride in pyridine and the excess anhydride is reacted with water and back-titrated [Instructions: C. J. Mahn, L. B. Genung and R. F. Williams, Analysis of Cellulose Derivatives, Industrial and Engineering Chemistry, Volume 14, No. 12, 935–940 (1942)].

The viscosity of the cellulose esters should be 0.4 to 0.5 poise, measured as a 20% strength solution in acetone. Cellulose esters which are preferably to be used have, in the case of the acetobutyrates, an acetic acid content of 17 to 23% by weight and a butyric acid content of about 45 to 50% by weight, and, in the case of the acetopropionates, a propionic acid content of 61–69% by weight and an acetic acid content of 2–7% by weight. The OH numbers are usually between 4 and 25. The weight-average molecular weights $\overline{M}_w$ are between 10,000 and 1,000,000, preferably between 100,000 and 500,000.

Suitable polyaryl sulphones in the context of the invention have weight-average molecular weights $\overline{M}_w$ (measured by the light scattering method in $CHCl_3$) of between 1,000 and 200,000, preferably between 20,000 and 60,000. Examples of these are the polyaryl sulphones which can be obtained by known processes from 4,4'-dichlorodiphenyl sulphone and a bisphenol, in particular 2,2-bis-(4-hydroxyphenyl)-propane, and have weight-average molecular weights ($\overline{M}w$) of 2,000 to 200,000.

Polystyrenes which are suitable according to the present invention are homopolymers of styrene or copolymers of styrene and, preferably, acrylonitrile and/or butadiene and/or maleates, which are obtained with $\overline{M}w$ of 10,000–600,000 ($\overline{M}w$ is measured in dimethylformamide at c=5 g/liter and 20° C.) from the monomers or a mixture of the monomers by suspension polymerisation in the presence of catalysts.

(For literature in this context, see: Beilsteins Handbuch der organischen Chemie (Beilsteins Handbook of Organic Chemistry), fourth edition, third supplement, Volume 5, pages 1163–1169, Springer Verlag 1964, and H. Ohlinger, Polystyrol, 1. Teil, Herstellungsverfahren und Eigenschaften der Produkte (Polystyrene, Part 1, Preparation processes and properties of the products), Springer Verlag 1955).

Mixtures of polymers which give optically transparent plastics are also suitable. The advantage of these mixtures is that the mechanical and, in particular, the chemical properties are improved, especially the resistance of the plastic towards the components of the liquid crystal phase at elevated temperatures.

Mixtures with silicones or polyesters are preferred.

Birefringence-free plastics are used in components, in particular displays, and other devices which use polarised light, such as microscopes and cameras.

These birefringence-free plastics are suitable in all cases where, for example, laser light sources, polarization filters, monolayers or dichroic dyestuffs are used. Compared with conventional glasses, they have the advantage that they are lighter and unbreakable. Furthermore, their preparation, by simpler handling, and production of the shapes from the precursor web of film is very flexible, so that the product can be produced very economically. The plastics according to the invention can also be covered by an additional amorphous protective film. Moreover, other additional finishes, for example to improve the flame-retardant properties, are also conceivable.

In the production of displays of plastic, it is advantageous to take certain measures which accommodate the properties of the material.

These include:
1. Using pleochroic dyestuffs instead of the polarisers.
2. Achieving mechanical stability by a sheet-like bonding, if appropriate coloured tone-in-tone with the pleochroic dyestuff.

The invention furthermore relates to displays of plastic, in which pleochroic dyestuffs are dissolved in the liquid crystal material. Azo dyestuffs or anthraquinone dyestuffs, such as are described, for example, in German Offenlegungsschrift No. 3,036,853, German Offenlegungsschrift No. 2,627,215, EP No. 49,035 and EP No. 26,004, are particularly suitable. A tone-in-tone or contrast dyeing can be produced by colouring the spacer or the adhesive occupying the separation with these dyestuffs or with other, optionally non-pleochroic dyestuffs.

A preferred embodiment is coloration with fluorescent dyestuffs, in particular coloration of the rear plate for the purpose of light collection and distribution of the brightness of the display.

The flexibility of the plastic hinders the adhesion in a frame customary in glass technology. The narrow bridge thereby formed can rapidly break under flexural stress. Rather, sheet-like maintenance of the separation is more advantageous. For this, a coloured film 5-20 μm thick in which the display pattern is stamped can be used. However, this method has disadvantages, especially with the electrode separations of about 10 μm customary today. The actual thickness of the film together with the 2 adhesive layers may not exceed this value. The film must thus be extremely thin, with high requirements imposed on the constancy of thickness. This leads to substantial problems when stamping out or cutting the mask, since stretching of the areas immediately adjacent to the cutting point is unavoidable. It is preferable to apply an adhesive in a constant thickness, for example by screen printing. Preferred adhesives are reactive adhesives, for example those based on epoxide resin or polyurethane.

The thin layers of film are relatively permeable to low-molecular compounds, in particular water or gases. Particular requirements are therefore imposed on the stability of the liquid crystals, which can have negative or positive dielectric anisotropy. One prerequisite is that they do not attack the coating material and at the same time are water-repellant. Suitable mixtures must be composed from case to case from the large number of known and commercially available products. Examples of suitable liquid crystal materials are the known phenylalkylcyclohexanes and biphenylalkyl derivatives.

Examples of suitable liquid crystal materials are mixtures containing 4-cyanobiphenyls. One example is mixture E 7 from Messrs. BDH Chemicals Ltd. (GB), and other examples are those containing predominantly 1-(4-cyanophenyl)-4-alkylcyclohexanes. An example of these is mixture ZLI 1132 from Messrs. Merck (Darmstadt). Mixtures of the abovementioned classes of substance and (4-cyanophenyl)-pyrimidines, for example mixture ROTN 30 from Messrs. F. Hoffmann-La Roche, are also suitable.

Further examples of commercially available and suitable liquid crystal mixtures for positive dielectric anisotropy are products based on cyanopyrimidine and cyanoesters, as well as mixtures of BCH, PCH and PCH-ester and PCH, BCH, BCH-ester and terphenyl (for example "ROTN 402", "ROTN 103", "Merck 1221 TNC", "Merck 1291 TNC", "Merck 1691" and "Merck 1840").

In addition, however, a large number of other components can be used, mixtures containing the constituent mentioned as a general rule being suitable. Particularly suitable compounds are those of the following classes of substance:

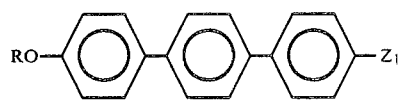

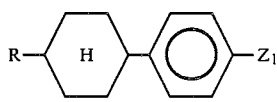

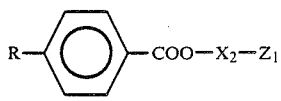
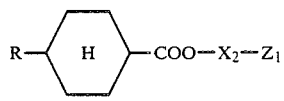

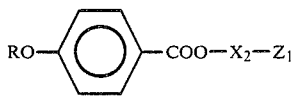
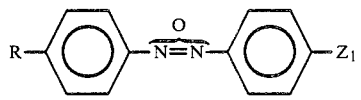

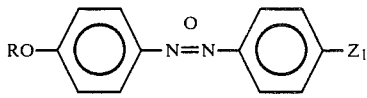
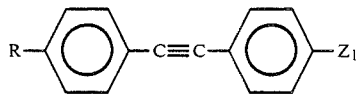

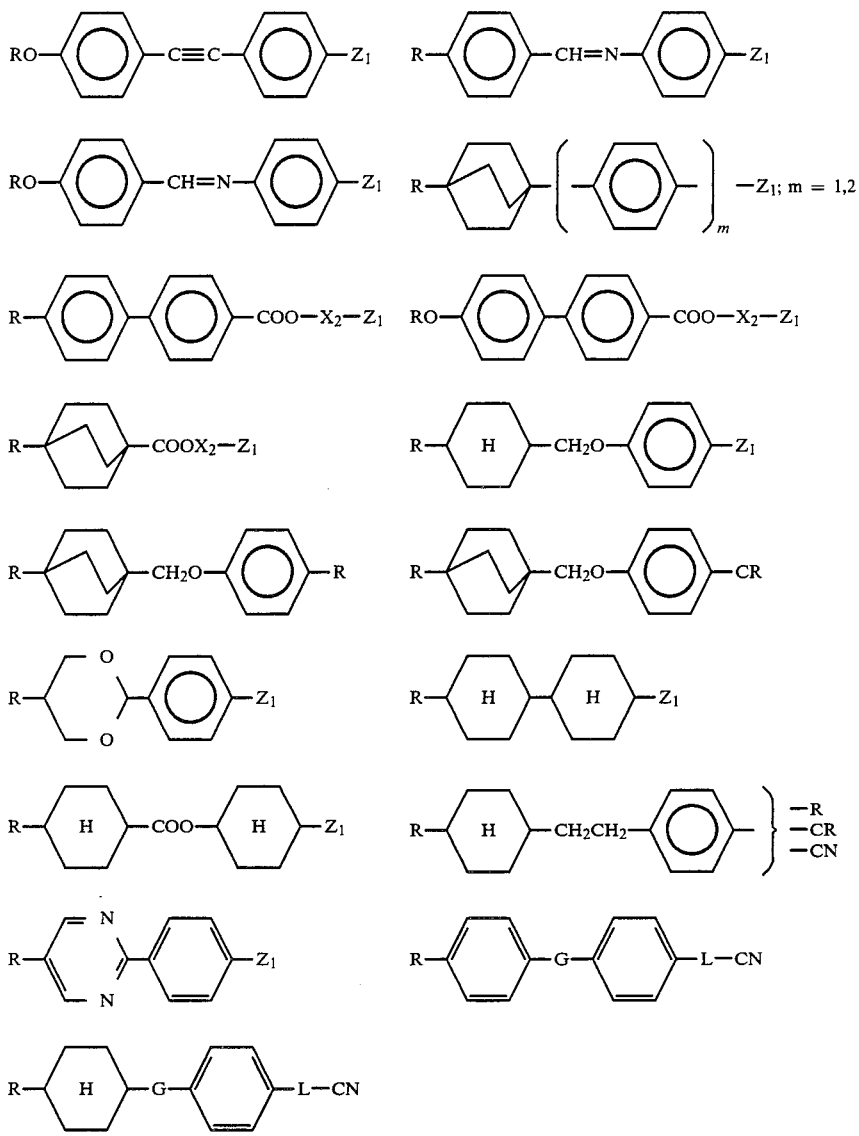

Each of the benzene rings contained in these formulae can be substituted by one or more substituents, for example fluorine. In these formulae R is an alkyl group, $X_2$ is a 1,4-phenylene, 4,4'-biphenylene or 2,6-naphthylene group, $Z_1$ is CN, R', OR', CO—O—$X_2$—$Z_2$, $Z_2$ is CN, R' or OR', G and L are —$CH_2CH_2$—, —CH=CH— and C≡C— and R' has the same meaning as R.

Alternatively, there is the possibility of increasing the coating thicknesses of the casing material. This can be effected by after-spraying the semi-finished product or the finished display with a material of low birefringence.

In a further embodiment, the display mask is produced as a depression by the injection moulding process. A sort of capsule is thereby formed, which can be filled from the top. The planar top is built up by customary techniques, such as ultrasound, laser, adhesives or thermal welding.

In glass technology, the cavity which the liquid crystal material is to occupy is first finished and then filled, for example in a vacuum process. This is complicated, especially with displays of large area, and leads to errors. A particular advantage of the displays according to the invention is that they are produced continuously from webs, and the instant they are formed they can be filled. The relatively soft nature of the plastic also enables the display to be filled after it has been finished, by piercing the plastic, for example with a cannula, and then sealing the filling orifice again.

The difficulties of permanently connecting glass electrically to the surrounding components, especially with displays of large area, are known.

In the process according to the invention, it is possible to produce the electronic control unit and the actual display separately and to bond these permanently thereafter. This technique denotes a substantial advance and ensures a wide latitude in the design of the display.

The orientation layer contains the materials known from the literature, such as polyvinyl alcohol, polyimide and the like. Si-containing polymers are preferably used. The inventive combination of plastic foils can be successfully used in connection with such type of displays in which the polarizing effect is not created by separate external polarizers but is due to the light optical action of the liquid crystal layer.

EXAMPLE

Bisphenol A polycarbonate having an average molecular weight of 38,000 is dissolved in methylene chloride to give a ~15% strength solution and this solution is applied to a slowly rotating, heated and polished cylinder via a doctor device. A clearly transparent film of coating thickness 150 μm is obtained.

This film is analysed quantitatively with a compensator in a polarisation microscope between crossed polarisers. The axis number 1 or 2 is examined in the conoscopical optical path of an interference figure tube.

The difference obtained between the main refractive indices $\Delta n = 64 \cdot 10^{-5}$, and the resulting optical path difference G is 96 nm. The product is optically monoaxial.

Two square sections of this film of equal size are combined, one with a parallel and one with a vertical position of the optical axes, between crossed polarisers and are tested between crossed polarisers. At the position of the film with a parallel arrangement, a considerable brightening results in the field of observation. In such a case elliptic polarized light is produced for which an extinction of light between crossed polarizers is no longer possible. In all cases where the indication of the display relies on a brightening effect which is observed by way of crossed polarizers, the brightening effect which is due to the birefringence of the two combined foils is strongly disturbing and may even completely hide the display effect.

If the two foils are however, arranged behind each other in such a manner that their principal axes are perpendicular with respect to each other, then the phase shift (optical path difference) produced by the first foil, is compensated by the second foil. After the light has passed the second foil there is no or only a minimal remaining optical path length difference. The measurement carried out with an acetone bonded compound foil made from the above described material and having an overal thickness of 380 nm shows a difference of $\Delta n = 3 \times 10^{-5}$ for the main refractive indices and only a very slight brightening corresponding to an optical path length difference of G=8 nm. As a consequence plane polarized light impinging on the compound foil remains plane polarized so that the complete extinction of light with crossed polarizers may be achieved. Upon such dark background the indication effect (f.i. caused by the birefringence of the nematic phase induced by an electric field) can be observed free from interference.

We claim:

1. Liquid crystal display comprising a birefringence-free arrangement of plastic foils, characterized in that two plastic foils having a single principal optical axis, said optical axis lying within the plane of the plastic foil, are arranged parallel one behind the other so that the optical axes of both plastic foils are forming an angle of 90°±7° and the material of the foil with regard to its optical properties and the thickness of the foils being selected in such a manner that the optical path differences $\Delta n_1 d_1$ for the light waves which are associated with the two main refraction indices within the first plastic foil is approximately equal to the optical path difference $\Delta n_2 d_2$ of the second foil, $\Delta n_1$, $\Delta n_2$ being the differences of the main refraction indices in the first and second foil, respectively, and $d_1$, $d_2$ standing for their thicknesses.

2. Liquid crystal display according to claim 1, characterized in that both foils with regard to their optical properties consist of the same material and have the same thickness.

3. Liquid crystal display according to claim 1, characterized in that the foils are welded flatly with one another.

4. Liquid crystal display according to claim 1, characterized in that the foils are bonded flatly with one another, a two-component adhesive being used as the adhesive.

5. Arrangement according to claim 4, characterized in that the adhesive has the same refractive index as the foil material.

6. Liquid crystal display according to claim 1, characterized in that the plastic is polyaryl sulphone, polystyrene, polyvinyl chloride, polyurethane, a styrene/acrylonitrile copolymer, a polymethylpentene, a polyacrylate, a polymethacrylate, a cellulose ester or a mixture or a copolymer containing the polymers mentioned.

7. Liquid crystal display according to claim 1, characterized in that the plastic is polycarbonate or a plastics mixture containing at least 10% by weight of polycarbonate.

8. Liquid crystal display according to claim 1, characterized in that plastic foils are provided with halogenated compounds, Si-containing polymers, polyacrylates or polymethacrylates on the surface.

9. Liquid crystal display according to claim 7, characterized in that the plastic is cast polycarbonate.

10. Liquid crystal display according to claim 9, characterized in that the cast polycarbonate has a weight-average molecular weight $\overline{M}_w$ of 75,000–110,000.

11. Liquid crystal display according to claim 1, in which a pleochroic dyestuff is dissolved in the liquid crystal material.

12. Liquid crystal display according to claim 8, characterized in that plastics foils are provided which are crosslinked on the surface.

* * * * *

UNITED STATES PATENT AND TRADEMARK OFFICE
CERTIFICATE OF CORRECTION

PATENT NO. : 4,544,583
DATED : October 1, 1985
INVENTOR(S) : Uwe Claussen, et al.

It is certified that error appears in the above-identified patent and that said Letters Patent is hereby corrected as shown below:

| | |
|---|---|
| Col. 2, line 35 | Delete "70°" and substitute --7°-- |
| Col. 2, line 42 | Delete "$N_2$" and substitute --$n_2$-- |
| Col. 3, line 19 | Correct spelling of "brightening" |
| Col. 7, last structure | Middle of formula delete "$-N\overset{O}{=}N-$" and substitute --$-N\overset{O}{=}N-$-- |

Signed and Sealed this

Second Day of September 1986

[SEAL]

Attest:

Attesting Officer

DONALD J. QUIGG

Commissioner of Patents and Trademarks